(12) United States Patent
Jackson et al.

(10) Patent No.: US 10,910,811 B2
(45) Date of Patent: Feb. 2, 2021

(54) CABLE GLAND ASSEMBLY

(71) Applicant: Hubbell Limited, London (GB)

(72) Inventors: Carl Jackson, Dukinfeld (GB); Jason Clark, Dukinfield Cheshire (GB)

(73) Assignee: Hubbell Limited, London (GB)

( * ) Notice: Subject to any disclaimer, the term of this patent is extended or adjusted under 35 U.S.C. 154(b) by 0 days.

(21) Appl. No.: 16/544,530

(22) Filed: Aug. 19, 2019

(65) Prior Publication Data

US 2020/0044432 A1 Feb. 6, 2020

Related U.S. Application Data

(63) Continuation of application No. 15/762,675, filed as application No. PCT/GB2016/052980 on Sep. 23, 2016, now Pat. No. 10,389,102.

(30) Foreign Application Priority Data

Sep. 25, 2015 (GB) .................................. 1517031.9

(51) Int. Cl.
*H02G 3/18* (2006.01)
*H02G 15/00* (2006.01)
(Continued)

(52) U.S. Cl.
CPC .............. *H02G 15/013* (2013.01); *F16L 5/02* (2013.01); *G02B 6/4471* (2013.01);
(Continued)

(58) Field of Classification Search
CPC ...... H02G 15/00; H02G 15/07; H02G 15/013; H02G 15/04; H02G 3/18; H02G 3/0675;
(Continued)

(56) References Cited

U.S. PATENT DOCUMENTS 4,810,832 A  3/1989 Spinner et al.
5,059,747 A * 10/1991 Bawa .................... H02G 3/0675
174/653

(Continued)

FOREIGN PATENT DOCUMENTS

DE    3633208 A1    4/1988
DE    19738517 C1   11/1998
(Continued)

OTHER PUBLICATIONS

GB1517031.9 Search Report dated Mar. 18, 2016 (2 pages).
(Continued)

*Primary Examiner* — Angel R Estrada
(74) *Attorney, Agent, or Firm* — Michael Best & Friedrich, LLP

(57) ABSTRACT

A gland assembly includes a gland body (3) and a cap nut (5) connected by screw threads (25). A cable holding device (11) is received within the cap nut (5) and has a plurality of fingers (19) configured to apply a gripping force to a cable (7) extending through the gland assembly in response to a torque applied to the cap nut (5). The fingers (19) are configured to increase the gripping force on the cable (7) in response to a linear force applied to the elongate member.

19 Claims, 7 Drawing Sheets

(51) Int. Cl.
*H02G 15/013* (2006.01)
*F16L 5/02* (2006.01)
*H02G 3/06* (2006.01)
*H02G 15/007* (2006.01)
*G02B 6/44* (2006.01)
*F16L 5/10* (2006.01)

(52) U.S. Cl.
CPC ......... *H02G 3/0666* (2013.01); *H02G 15/007* (2013.01); *F16L 5/10* (2013.01)

(58) Field of Classification Search
CPC ........ H02G 3/065; H02G 15/007; H01R 4/66; H01R 13/59; F16L 5/02; G02B 6/4471
USPC ....... 174/650, 651, 652, 653, 654, 660, 135, 174/153 G, 99 R, 72 A, 68.1, 73.1, 74 R, 174/77 R, 152 G, 655; 16/2.1, 2.2; 248/68.1, 49
See application file for complete search history.

(56) References Cited

U.S. PATENT DOCUMENTS

| | | | |
|---|---|---|---|
| 5,927,892 A | 7/1999 | Teh-Tsung | |
| 6,034,325 A | 3/2000 | Nattel | |
| 6,177,633 B1 | 1/2001 | Gretz | |
| 8,367,944 B2 | 2/2013 | Chiou | |
| 8,490,513 B2 | 7/2013 | Chiou | |
| 8,766,109 B2 | 7/2014 | Duval | |
| 9,312,629 B2 | 4/2016 | Smith | |
| 9,431,815 B1 | 8/2016 | Findley | |
| 10,389,102 B2 * | 8/2019 | Jackson | H02G 3/0666 |
| 2006/0105628 A1 | 5/2006 | Montena | |
| 2015/0048614 A1 | 2/2015 | Coyle, Jr. | |
| 2015/0200531 A1 | 7/2015 | Chiu | |

FOREIGN PATENT DOCUMENTS

| | | |
|---|---|---|
| EP | 2763254 A1 | 8/2014 |
| GB | 2073508 A | 10/1981 |
| GB | 2509727 A | 7/2014 |

OTHER PUBLICATIONS

PCT/GB2016/052980 International Search Report and Written Opinion dated Dec. 6, 2016 (11 pages).
EP16775845.7 Examination Report dated Oct. 25, 2019 (6 pages).
European Patent Application No. 16775845.7 Examination Report dated Nov. 6, 2020 (8 pages).

* cited by examiner

CABLE GLAND ASSEMBLY

The present invention relates to a gland assembly. The invention has particular, but not exclusive, application to gland assemblies for sealing around electrical cables. However, the invention also has application to gland assemblies for sealing around fibre optic cables, pipes and other conduits.

Gland assemblies are commonly used for sealing around a cable or conduit passing through an opening in a wall or bulkhead. For example, cable gland assemblies may be used to seal around a cable entering an enclosure such as a junction box, containing electrical equipment, to prevent fluids entering or exiting the enclosure. A typical cable gland assembly employs a sealing arrangement that surrounds a cable extending through the gland assembly. The sealing arrangement is urged inwardly to engage and seal around the cable when two parts of the gland assembly are screwed together.

With this type of sealing arrangement, problems can arise when a force is applied to the cable. For example, pulling force can weaken or break connections to the cable inside the junction box.

It is a desired aim therefore of the present invention to provide a gland assembly in which the cable and associated cable connections within a junction box are protected against forces such as pulling forces.

According to the invention, there is provided
a gland assembly including a gland member; and a holding device received within the gland member, the holding device and gland assembly configured to apply a gripping force to an elongate member extending through the gland assembly in response to a torque applied to the gland member, the holding device further configured to increase the gripping force on the elongate member in response to a linear force applied to the elongate member.

By using the holding device, the elongate member is supported, so that it may not be pulled out of the gland assembly.

The gripping force may be applied by the holding device engaging the surface of the elongate member.

The holding device may include gripping means, the gripping means configured to engage the surface of the elongate member. The gripping means may be arranged such that the engagement between the holding device and the elongate member increases in response to the linear force applied to the elongate member.

The holding device may include an assembly engagement element, the assembly engagement element arranged to engage the gland assembly and the gripping means.

The gripping means may only engage the gland assembly indirectly, through the engagement element.

The gland member may be rotatable relative to the gripping means, such that rotation of the gland member relative to the elongate member does not cause rotation of the gripping means relative to the elongate member and a torque applied to gland member is not imparted to the elongate member.

The gripping means may comprise a hub and one or more fingers extending from the hub. The one or more fingers may have ridges on an inner surface, arranged to contact the elongate member, in use. The ridges may be angled in the opposite direction to a linear force pulling the elongate member out of the end of the gland member, such that they engage in response to the linear force, and oppose the linear force.

The hub may be connected to or engage a support member. The support member may form the engagement element.

The gripping means may comprise a resiliently biased member. The resiliently biased member may be a helical spring, arranged, in use, around the elongate member. The spring may have a constant diameter, or a tapering diameter.

The resiliently biased gripping means may be resiliently biased against the linear force. The resiliently biased gripping means may be resiliently biased against twisting of the elongate member relative to the gland assembly.

The holding device may engage the elongate member around a part or the whole of a circumference of the elongate member. The holding device may also extend along a portion of the length of the elongate member received in the gland assembly.

The gland assembly may include a seal. The seal may provide a fluid tight seal with the outer surface of the elongate member.

The seal may be provided integrally with or separately from the holding device. The seal may be connected to the support member.

The gland member may comprise a first end forming an end of the gland assembly, and a second end opposite the first end, wherein the seal may be provided between the first end and the holding device, or between the second end and the holding device.

The holding device may engage the elongate member at a first position along the length of the elongate member, and the seal may engage the elongate member at a second position along the elongate member.

The gland assembly may include a second gland member, the gland member and the second gland member being engageable by means of mating screw threads, wherein the holding device, gland member and second gland member are configured such that the gripping force is applied in response to rotation of the gland member relative to the second gland member to engage and tighten the mating screw threads.

The gland assembly may comprise a through bore in which the elongate member is received, the through bore having an inner surface, the inner surface including an urging surface configured to urge the holding device towards the elongate member, as the screw threads are engaged and tightened.

The urging surface may be formed on the gland member and/or the second gland member.

The holding device may be deformable, such that it deforms in order to apply the gripping force, as the screw threads are engaged and tightened.

The gland assembly may comprise a third gland member, arranged to be coupled to an aperture in a wall or bulkhead through which the cable passes, in use. A second seal may be associated with the second or third gland member.

The gland assembly may comprise the elongate member. The elongate member may be a cable.

There now follows, by way of example only, a description of embodiments of the invention, described with reference to the accompanying drawings, wherein like reference numerals are used to indicate the same or similar parts and in which.

In the description of the embodiments that follows, the construction and/or arrangement and/or function and/or operation of any part is only described insofar as necessary for an understanding of each embodiment and therefore the description of features that are the same or similar in different embodiments may not be repeated as these will be understood from the description of other embodiments. Accordingly, the embodiments are not to be read and interpreted in isolation and any feature described in a particular embodiment will be understood to have application to other embodiments unless specifically excluded by the description.

Figure 1:
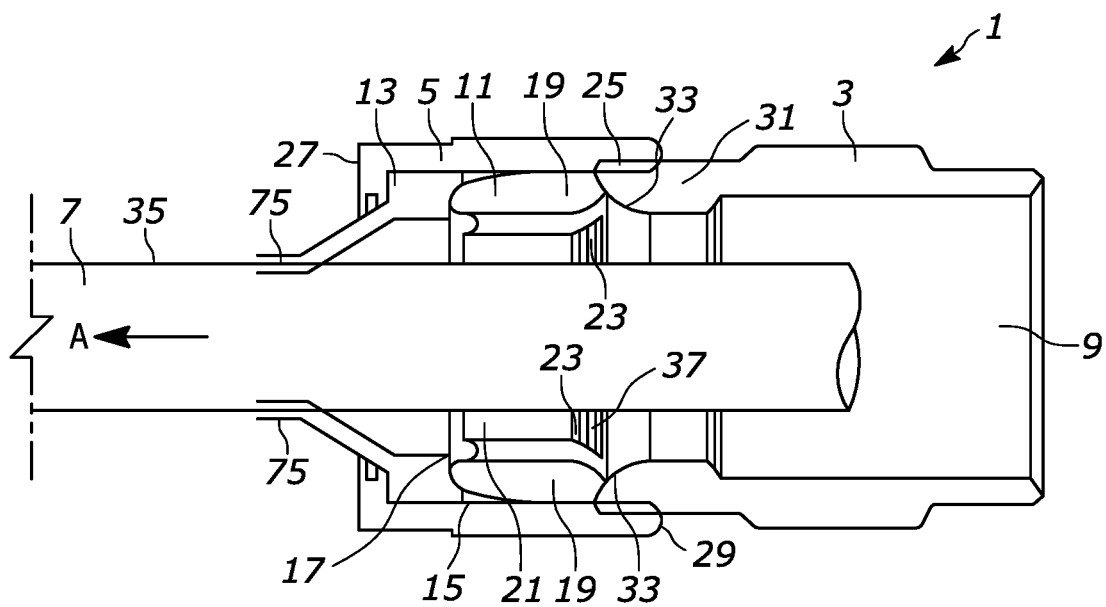
FIG. 1 is a longitudinal sectional view of a cable gland assembly according to an embodiment of the invention.
Figure 2A:
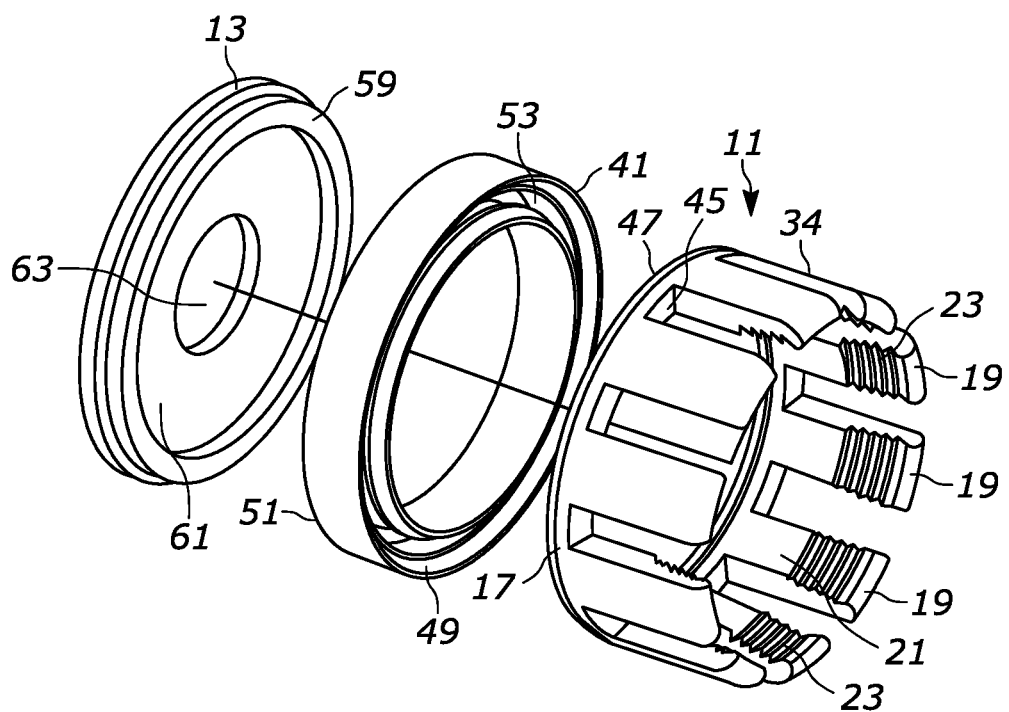
FIG. 2A is an exploded perspective view of a holding device for a cable gland assembly.
Figure 2B:
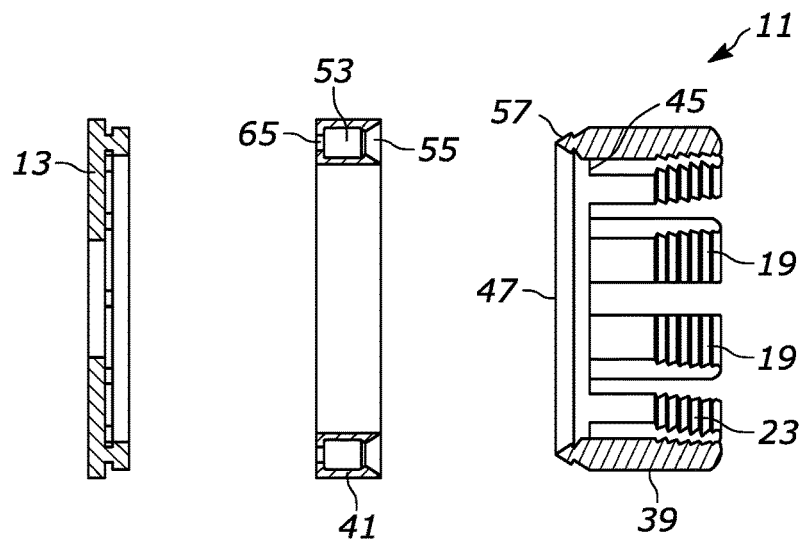
FIG. 2B is an exploded longitudinal sectional view of the holding device of FIG. 2A.
Figure 2C:
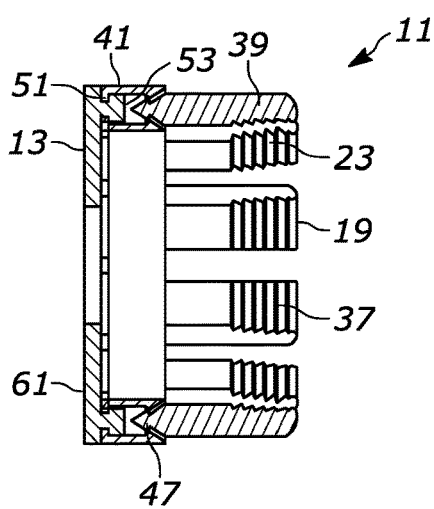
FIG. 2C is a longitudinal sectional view showing the holding device of FIGS. 2A and 2B assembled.
Figure 2D:
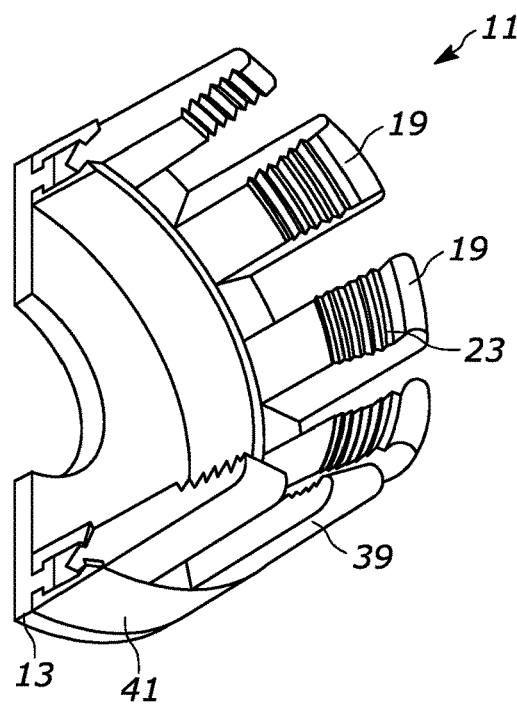
FIG. 2D is a perspective sectional view of the assembled holding device of FIG. 2C.

Referring to FIG. 1 of the accompanying drawings, the back or rear or entry end portion of a cable gland assembly 1 includes a cap nut 5 (or back nut or first gland member), and a body 3 (or middle nut or second gland member). The body 3 and cap nut 5 define a through bore 9, through which a cable 7 passes. The body 3 and cap nut 5 may be made of metal or alloy, for example brass.

A cable holding device 11 is provided within the portion of the through bore 9 defined by the cap nut 5. A seal 13 is also located within the portion of the through bore 9 defined by the cap nut 5. The seal 13 has a portion 75 that form a fluid tight seal with the outer surface 35 of the cable 7, to prevent ingress or egress of fluids, for example liquids or gases, and/or solids, for example particulates or dusts, to/from the cable gland assembly 1. The seal 13 may be made of elastomeric material such as natural or synthetic rubber. The seal 13 may accommodate cables of different size (diameter).

The cable holding device 11 extends around the circumference of the inner surface 15 of the through bore 9. The holding device 11 is formed from an annular ring 17 (or hub), from which a number of spaced fingers 19 extend. The inner surface 21 of the fingers 19 is preferably provided with ridges 23 at the end of the fingers 19. In this embodiment there are ten fingers 19 but there may be more than or less than ten fingers 19 in other embodiments. The fingers 19 are preferably uniformly spaced apart in the circumferential direction.

In use, the body 3, seal 13, cable holding device 11 and cap nut 5, are threaded over the cable 7, with the seal 13 and cable holding device 11 provided within the cap nut 5. The cap nut 5 has a first end 27, which forms the end of the cable gland assembly 1, and a second end 29, opposite the first end 27. The seal 13 is provided at the inside of the first end 27, and then the holding device 11 is provided with the annular ring 17 resting against the seal 13, with the fingers 19 facing towards the second end 29. The cap nut 5 is then engaged with the body 3 by mating screw threads 25 provided on the cap nut second end 29 and the body end 31.

The body end 31 is sized to fit within the second end 29 of the cap nut, and formed with a curved end wall 33. The curved end wall 33 is curved inwards from the outside of the body 3, towards the through bore 9. As the mating screw threads 25 are tightened, the second end 29 of the cap nut 5 moves passed the body end 31. The fingers 19 press against the curved end wall 33, and, because the hub annular ring 17 is resting against the seal 13 and cannot move, the fingers 19 are deflected inwards, towards the cable 7. The curved outer end wall 33 can thus be considered an urging surface 33.

The fingers 19 should be sufficiently deformable such that they can deflect and eventually grip the cable 7. Once the fingers 19 are in contact with the cable outer surface 35, further tightening of the screw threads 25 causes the fingers 19 to grip the cable 7 tighter, as the fingers 19 are deflected further inwards. The deflection should be sufficient that the cable 7 is gripped, but not so large that the cable 7 is damaged.

The length of the mating screw threads 25 and slope of the urging surface 33 determine the maximum inward deflection of the fingers 19, since the fingers 19 do not deflect once the screw threads 25 are completely tightened. The length and material of the fingers 19 and the urging surface 33 may also affect the maximum inward deflection due to the physical properties of the fingers 19. The maximum inward deflection determines the minimum size (diameter) of cable 7 that can be secured by the cable holding device 11 in the cable gland assembly 1. As will be appreciated, tightening of the screw threads 11 can be controlled to adjust the inward deflection of the fingers 19 cable holding device 11 to allow cables of different size (diameter) to be secured by the cable holding device 11. In this way the cable gland assembly can be used to secure a range of cables of different size (diameter) from a minimum size (diameter) to a maximum size (diameter).

In use, it may be that forces are applied to pull the cable out of the cable gland assembly 1. In one example, these forces are in the direction of arrow A, away from the first end 27 of the cap nut 5. The force may be only linear in this direction, or may include components in other directions, such as a diagonally downwards or upwards force.

As shown in FIG. 1, the ridges 23 are angled with an apex 37 facing in the opposite direction to the force in direction A, such that the ridges 23 form an obtuse angle to the cable surface 25 when measured from the cap nut second end 29, and an acute angle when measured from the first end 27. Therefore, on application of a force in direction A, the ridges 23 grip into the cable surface 25, increasing the gripping force on the cable 7. This supports or holds the cable 7, and prevents the cable 7 from being pulled out of the gland assembly 1, in direction A. It will be appreciated that the cable holding device 11 may have any number of fingers 19, with any number of ridges 23, over any portion of the length of the fingers. Further, the fingers 19 may be resilient, to allow re-use of the holding device 11.

FIGS. 2A to 2D show a cable holding device 11 and seal 13 coupled to a support (or hub) member 41. The support member 41 is formed of an annular ring. The cable holding device 11 is coupled to one side and the seal 13 is coupled to the other side of the support member 41. The support member 41 has a first end 49 and an opposite second end 51. The support member 41 may be rigid. The support member may be made of plastics.

The cable holding device 11 includes a ring (or hub) 17 from which the fingers 19 extend. The ring 17 has a first end 45, from which the fingers 19 extend, and a second end 47, opposite the first end 45. The support member 41 is formed with a channel 53 in the annular ring. At the first end 49 of the support member 41, the channel 53 is partially closed, with an opening 55. The second end 47 of the ring 17 of the cable holding device 11 is formed with a projection 57 that is wider than the opening 55, but deformable so that it can be forced past the opening to create a snap fit between the cable holding device 11 and the support member 41. The projection 57 sits in the channel 55, and can freely rotate, such that the cable holding device 11 can freely rotate relative to the support member 41.

The seal 13 is provided on the other side of the support member 41. The seal 13 is formed by an annular ring member 59 provided with a membrane 61 having an opening 63 narrower than the annular ring 59. The cable 7 passes through the opening 63 and the membrane forms a fluid tight seal with the outer surface of the cable 7.

The membrane 61 may be deformable to accommodate cables of different size (diameter).

The second end 51 of the channel 53 in the support member 41 is also partially closed with an opening 65. The annular ring 59 of the seal 13 is formed in a similar manner to the projection 57 on the ring 17 of the cable holding device 11, such that the seal 13 may also be free to rotate relative to the support member 41.

In use, the support member 41 and/or the seal 13 may be coupled to the cap nut 5, for example, through the seal 13 or by direct contact, but the cable holding device 11 is not. Therefore, rotation of the cap nut 5 and/or gland assembly 1 may result in rotation of the support member 41 and/or the seal 13, but not the cable holding device 11. Therefore, rotation of the cap nut 5 and/or gland assembly 1 is not passed on to the cable 7, or vice versa. It will be appreciated that combining the cable holding device 11 and seal 13 as described above is optional. The above structure is just one example of a cable holding device 11 combined with other elements. By way of example, only, the seal 13 and support member 41 may be combined and the cable holding device 11 separate or the cable holding device 11 and support member 41 may be combined and the seal 13 separate. Further, any suitable means may be used to connect the cable holding device 11, support member 41 and seal 13 rather than snap fit. The snap fit shown in the Figures is also just one example of the snap fit.

Figure 3:
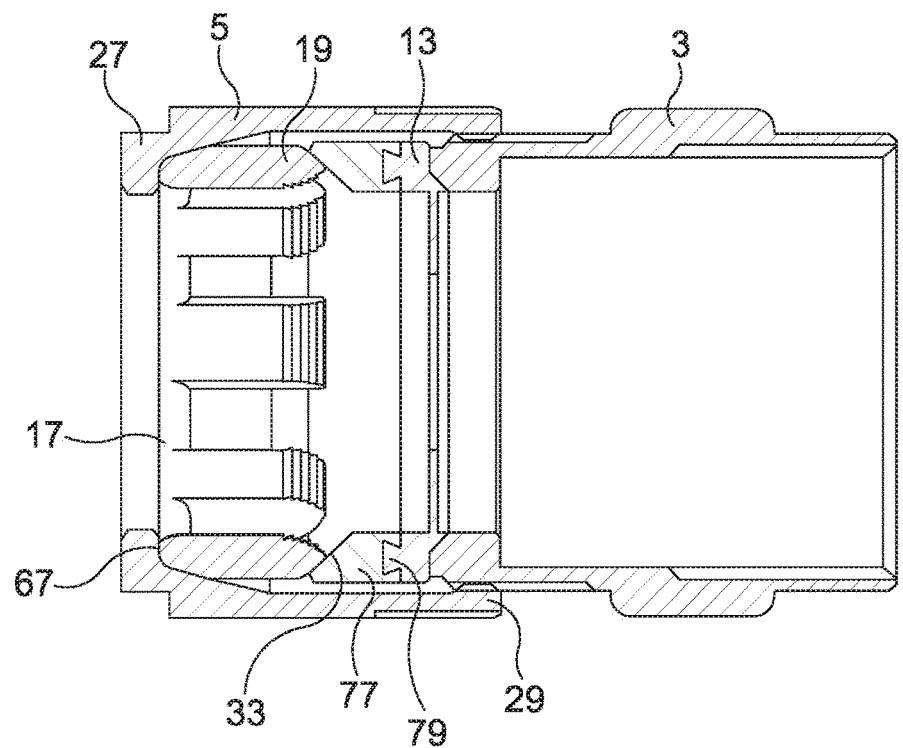
FIG. 3 is a longitudinal sectional view of a cable gland assembly according to another embodiment of the invention.

FIG. 3 shows a cable gland assembly according to another embodiment of the invention. In the embodiment shown in FIG. 1, the hub 17 of the cable holding device 11 rests against the seal 13. In the embodiment shown in FIG. 3, the hub 17 of the cable holding device 11 rests against a ledge 67 formed in the first end 27 of the cap nut 5 and the seal 13 rests against the body 3. The cable holding device 11 is still arranged with the fingers 19 facing the second end 29 of the cap nut, and the urging surface 33 is provided by an annular ring (or support) member 77 provided between the seal 13 and the fingers 19. The annular ring member 77 is coupled to the seal 13 through interconnecting formations 79 formed in the seal 13 and annular ring member 77. The seal 13 may be made of elastomeric material such as natural or synthetic rubber. The seal 13 may accommodate cables of different size (diameter). The ring member 77 may be rigid. The ring member 77 may be made of plastics.

Figure 4:
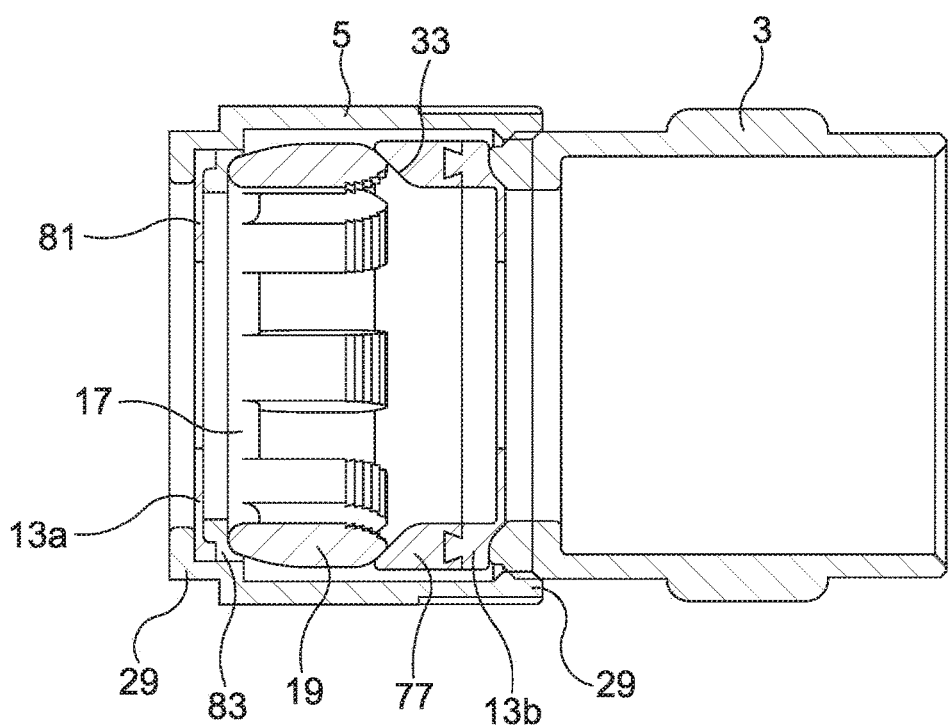
FIG. 4 is a longitudinal sectional view of a cable gland assembly according to another embodiment of the invention.
Figure 5:
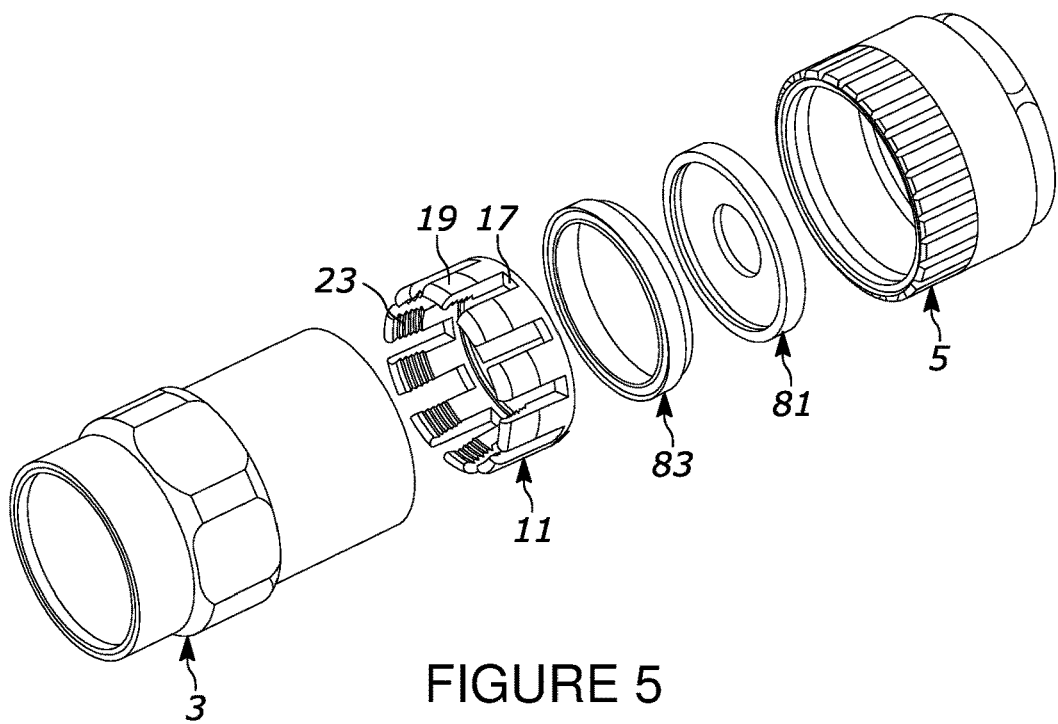
FIG. 5 is a perspective section view of a cable gland assembly according to another embodiment of the invention.
Figure 6:
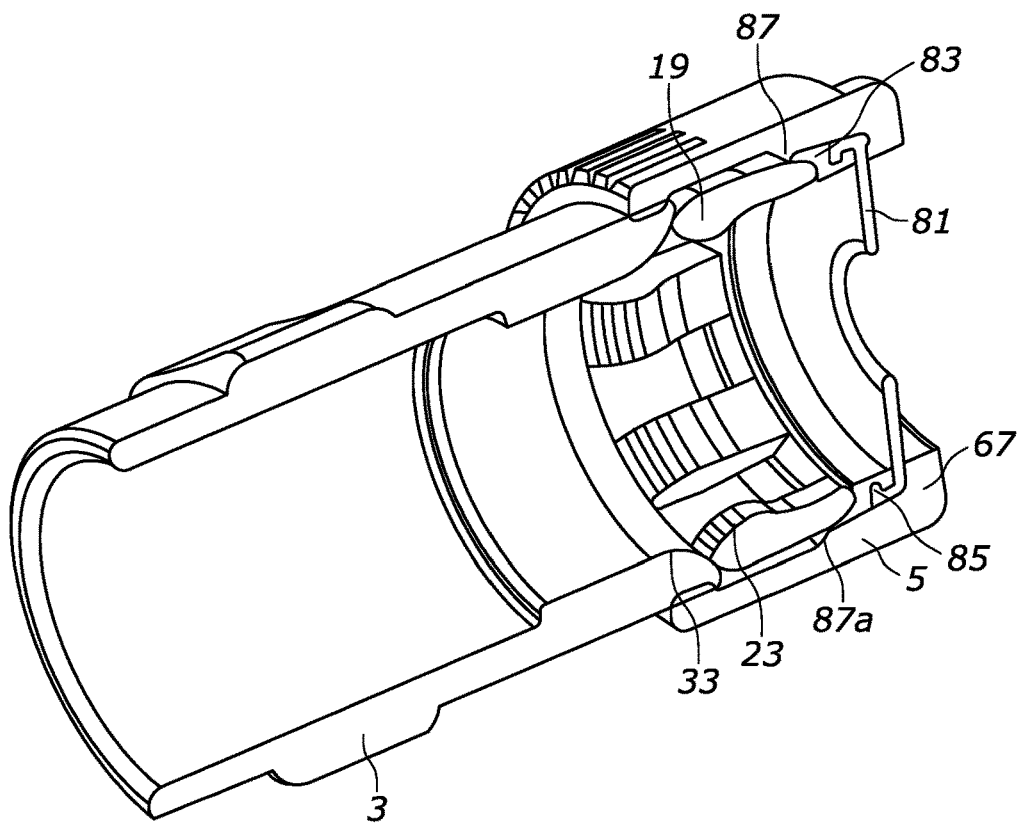
FIG. 6 is an exploded isometric view of the cable gland assembly of FIG. 5.

FIG. 4 shows a modification to the cable gland assembly of FIG. 3 according to another embodiment of the invention. In this embodiment, two seals 13a and 13b are provided. A first seal 13a is provided between the first end 27 of the cap nut 5 and the cable holding device 11. A second seal 13b is provided between the second end 29 of the cap nut 5 and the holding device 11 adjacent the body 3 in similar manner to the seal in FIG. 3. The first seal 13a is provided by an annular seal member 81 and is retained in the cap nut 5 by an annular ring (or support) member 83 that provides a seat for the hub 17 of the cable holding device 11. The seal member 81 may be deformable to accommodate and adapt to provide a seal with cables of different size (diameter). The seal member 81 may be made of elastomeric material such as natural or synthetic rubber or any other suitable elastomer. The ring member 83 may be rigid to provide a seat for the cable holding device 11. The ring member 83 may be made of plastics material. It will be appreciated that the arrangement in FIG. 4 is shown by way of example only, to illustrate a gland assembly 1 including two seals 13 within the cap nut 5. As with other embodiments, the seals 13a, 13b may be provided in any suitable manner, and any suitable holding device 11 may be used.

FIGS. 5 to 8 shows a modification to the cable gland assemblies of FIGS. 3 and 4 according to another embodiment of the invention. In this embodiment, the urging surface 33 for the ends of the fingers 19 of the cable holding device 11 is provided by the curved end wall of the body 3 similar to FIG. 1. Also in this embodiment, the seal 13 is provided by an annular seal member 81 retained in the cap nut 5 by a ring member 83 to locate the seal member 81 between the ring (or support) member 83 and the lip or ledge 67 at the end of the of the cap nut 5 similar to FIG. 4. As shown the seal member 81 and ring member 83 have co-operating formations 85, for example rib and groove, to connect the seal member 81 to the ring member 83 although this may not be essential and other means of connecting the seal member 81 to the ring member 83 may be employed. Also, as shown the ring member 83 is retained by a rib 87 on the internal surface of the cap nut 5. The rib 87 has an inclined lead-in or ramp face 87a to facilitate passage of the ring member 83 in the insertion direction and the ring member may be a snap fit behind the rib 87 to restrict removal of the ring member 83 and seal member 81. In this way, the cap nut 5 may be supplied with the ring member 83 and seal member 81 pre-assembled within the cap nut 5. This may assist installation by reducing the number of separate parts and prevent the cable gland assembly being installed without the seal member or with the incorrect seal member. The seal member 81 may be made of elastomeric material such as natural or synthetic rubber or any other suitable elastomer. The ring member 83 may be rigid. The ring member 83 may provide a curved seat 89 for the cable holding device 11.

The ring member 83 may be made of plastics material.

In use the fingers 19 of the cable holding device 11 are deflected inwards to grip and retain the cable 7 by tightening the cap nut 5 on the body 3 as described previously. The grip may be assisted by the provision of ridges 23 on the fingers 19 as described previously. The cable holding device 11 is operable to resist forces applied to the cable 7 in the direction of arrow A to pull the cable 7 out of the cable gland assembly 1 and in particular acts to increase the gripping force on the cable 7 as described previously. The force may be only linear in this direction, or may include components in other directions, such as a diagonally downwards or upwards force.

Figure 7:
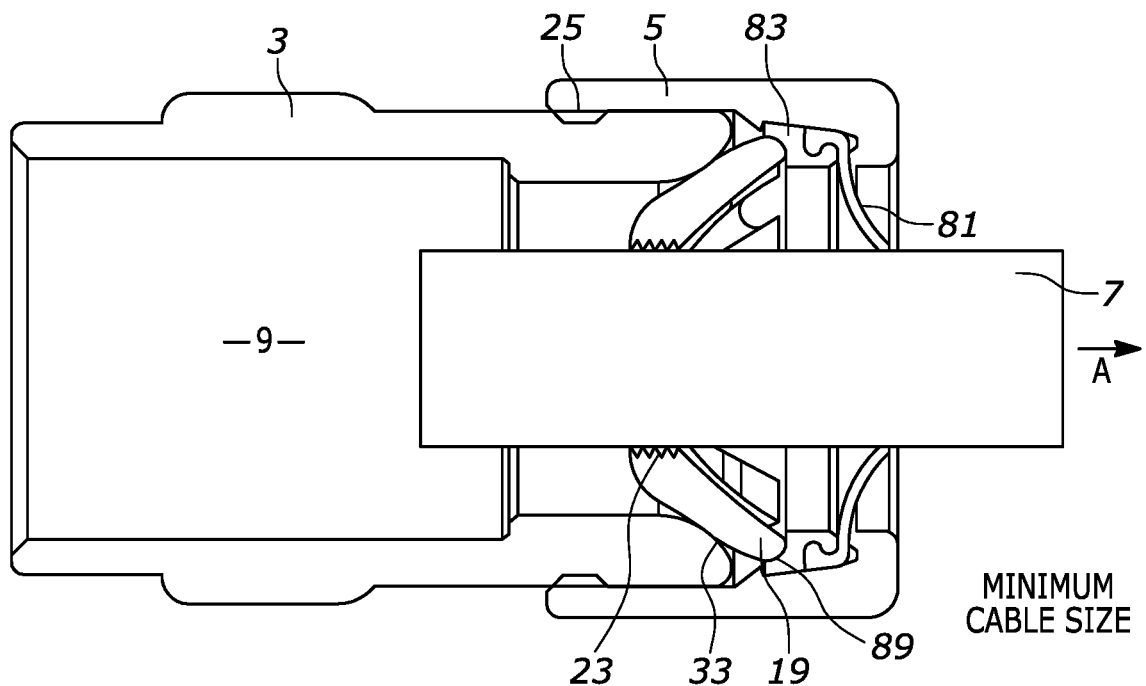
FIGS. 7 and 8 are longitudinal sectional views of the cable gland assembly of FIGS. 5 and 6 showing minimum and maximum cable sizes.
Figure 8:
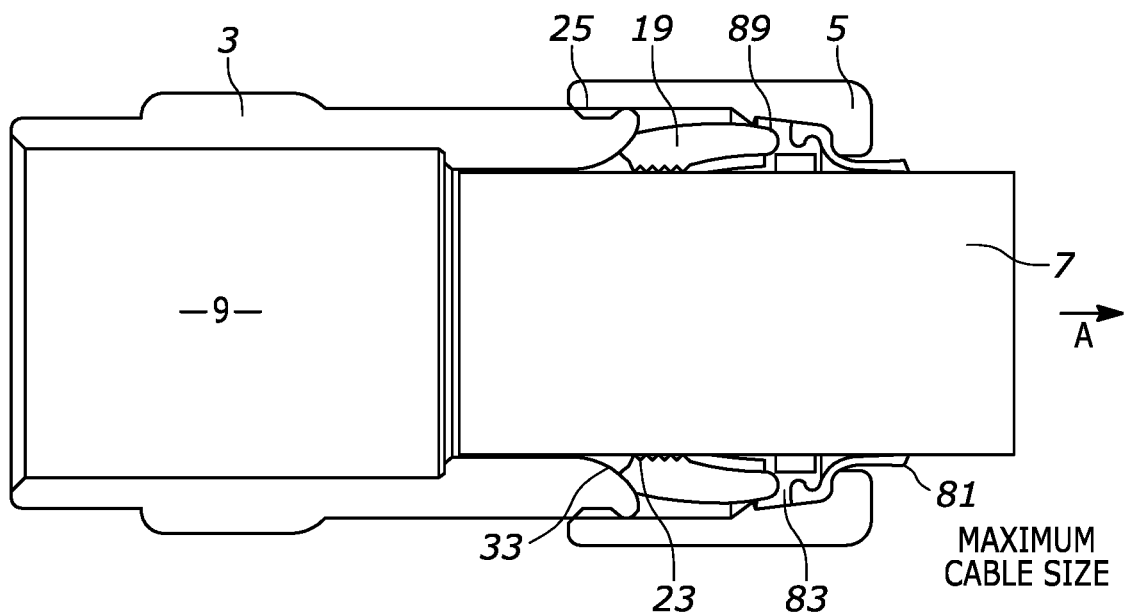

The deflection of the fingers 19 can be controlled to accommodate a range of cables 7 of different size (diameter) for example from a minimum size (diameter) shown in FIG. 7 to a maximum size (diameter) shown in FIG. 8. The seal member 81 can also deform to accommodate the different size (diameter) of cables 7. The ring member 83 provides a curved seat 89 for the ring (hub) 17 of the cable holding device 11 so that, on tightening the cap nut 5 to deflect the fingers 19 of the cable holding device 11 inwards, the hub 17 can turn about the seat to some extent to assist deflection of the fingers 19. The ring member 83 may also be rotatable relative to the hub 17 so that torque applied to the cap nut 5 is not transmitted to the cable 7 through the cable holding device 11.

In other embodiments, the urging surface 33 may be formed in the body 3, and the seal 13 may be provided elsewhere (for example between the ring 17 and the ledge 67), or the urging surface 33 may be formed as part of the seal. The interconnection of the seal member 81 and ring member 83 may also be omitted.

Figure 9:
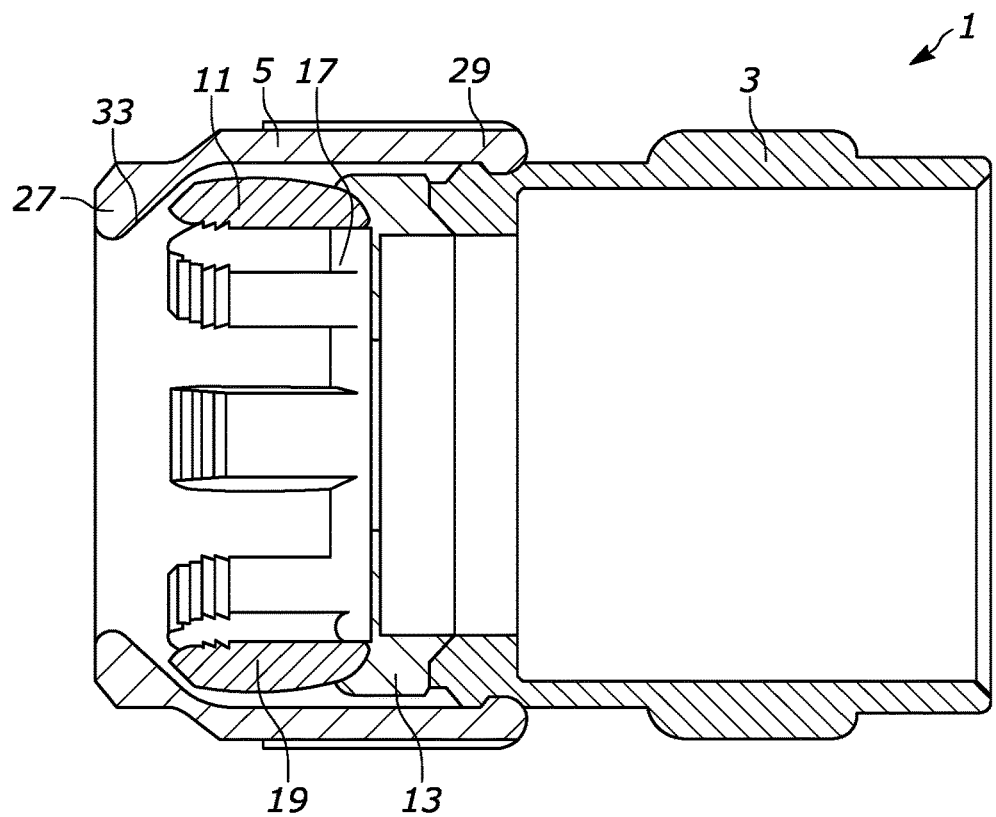
FIG. 9 is a longitudinal sectional view of a cable gland assembly according to another embodiment of the invention.

FIG. 9 shows a cable gland assembly according to another embodiment of the invention. In the embodiment shown in FIG. 1, the fingers 19 extend from the hub 17 towards the cap nut second end 29. In the embodiment shown in FIG. 9, the holding device 11 is arranged such that the fingers 19 extend from the hub 17 towards the cap nut first end 27. The urging surface 33 is formed in the cap nut first end 27, and the hub 17 rests against the seal 13, which in turn rests against the body 3. In other embodiments, the hub may rest directly against the body 3 or a ledge formed in the cap nut second end 29, and the seal 13 may be provided elsewhere.

It can be seen from the embodiments of FIGS. 1 to 9 that the cable holding device may be arranged with the fingers 19 facing away from or towards the cap nut first end 27. It will also be appreciated that the ridges may be directed in either direction—to oppose a force in direction A (as shown in FIGS. 1 to 8) or to oppose a force in the opposite direction (as shown in FIG. 9).

From the above embodiments, it can be seen that the hub 17 may rest against the seal 13, a ledge formed in the cap nut first end 27, a ledge formed in the cap nut second end 29, or the body 3. It will also be appreciated that the hub 17 may rest against a separate element (not shown) threaded over the cable 7, within the cap nut 5.

In all of the above embodiments, the urging surface 33 may also be formed in the seal 13, the cap nut first end 27, the cap nut second end 29, or the body 3. It will also be appreciated that urging surface 33 may be formed in a separate element threaded over the cable 7, within the cap nut 5.

Figure 10:
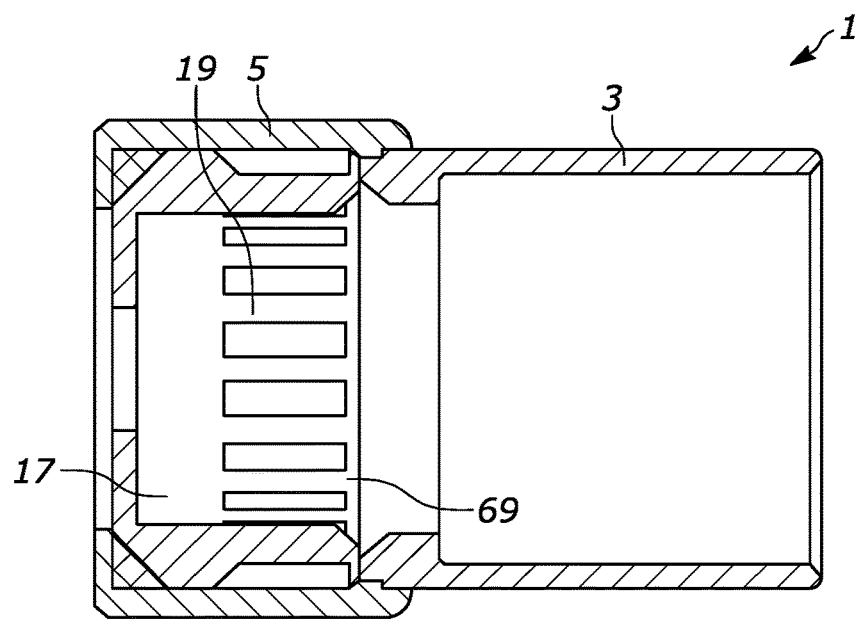
FIG. 10 is a longitudinal sectional view of a cable gland assembly according to another embodiment of the invention.

FIG. 10 shows a cable gland assembly according to another embodiment of the invention. In this embodiment, the ends of the fingers 19 of the cable holding device 11 are joined by an annular ring 69. The annular ring 69 grips around the whole circumference of the cable 7, and so increases the griping force. Ridges (not shown) may be provided on the fingers 19 and/or the annular ring 69. The annular ring 69 may be incorporated into any of the cable holding devices discussed above. The hub 17 may also include the seal 13. It will be appreciated that the cable holding device 11 may have any number of fingers 19, with any number of ridges, over any portion of the length of the fingers. Further, the fingers may be resilient, to allow re-use of the holding device 11 after removal of a cable 7.

Figure 11:
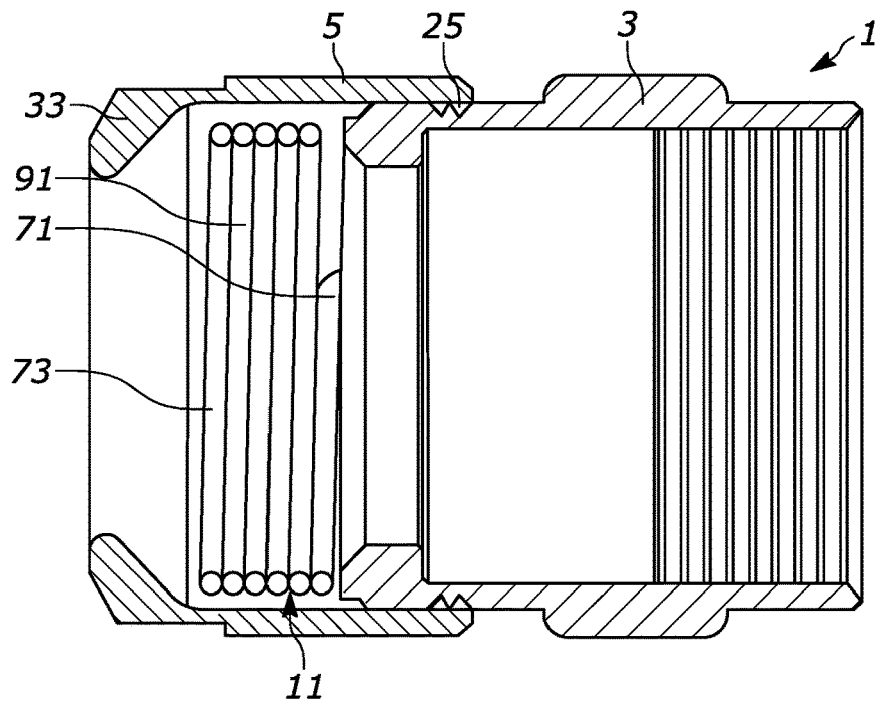
FIG. 11 is a longitudinal sectional view of a cable gland assembly according to another embodiment of the invention.

FIG. 11 shows a cable gland assembly according to another embodiment of the invention. In general, the cable gland assembly 1 shown in FIG. 11 is the same as shown in FIGS. 1 to 10. The key differences will be explained below.

In the embodiments shown in FIGS. 1 to 10, the cable holding device 11 has fingers 19, which can be considered gripping means. In the embodiment shown in FIG. 11, the cable holding device 11 is a helical spring 91 of constant diameter, threaded over the cable 7. Here, the gripping means is formed by the coils of the spring.

A first end 71 of the spring 91 is located at the end of the body 3, and the urging surface 33 is formed in the cap nut first end 27. As the mating screw threads 25 of the cap nut 5 and body 3 are tightened, a second end 73 of the spring 91, opposite the first end 71, gradually tightens around the cable 7. As the screw threads 25 are further tightened, the length of the spring 91 engaging the cable 7 (the number of coils), and thus the gripping force, increases.

Figure 12:
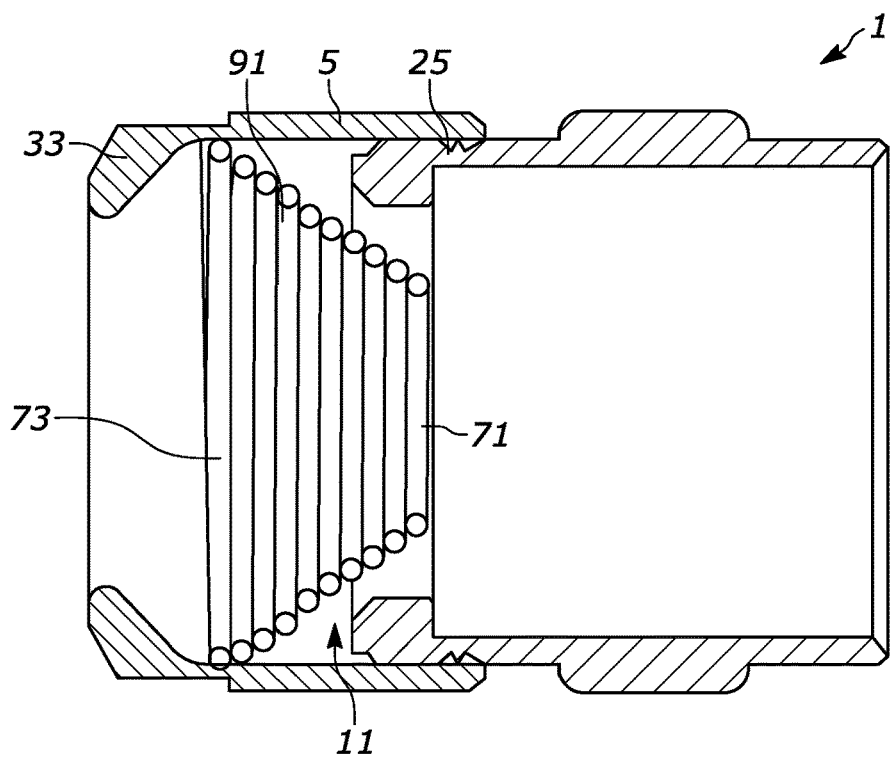
FIG. 12 is a longitudinal sectional view of a cable gland assembly according to another embodiment of the invention.

FIG. 12 shows a modification to the cable gland assembly of FIG. 11 according to another embodiment of the invention. In this embodiment, the cable holding device 11 is again provided by a spring 91 that surrounds the cable. In this embodiment the diameter of the spring 91 increases from the first end 71 to the second end 73. In this embodiment, the first end rests on a projection formed in the body 3, but it may also rest against a projection in the cap nut 5, or any other suitable surface. It will be appreciated that the diameter may also decrease from the first end 71 to the second end 73, and the wider end may be adjacent or opposite the urging surface 33.

It will be appreciated that, as with the embodiments of the holding device 11 with fingers 19, the urging surface may be formed in the cap nut first end 27, the cap nut second end 29, or the body 3. It will also be appreciated that urging surface 33 may be formed in a separate element threaded over the cable 7, within the cap nut 5, or body 3. The opposite end of the spring may also rest on any suitable surface.

For the embodiments shown in FIGS. 11 and 12, a separate seal (not shown) may be provided, in a similar fashion to FIGS. 1 to 10. The urging surface 33 may be provided by the seal 13, or the opposite end of the spring 91 may rest against the seal 13.

For the embodiments shown in FIGS. 11 and 12, the spring 91 may also resist twisting of the cable 7 relative to the gland assembly 1, in a similar fashion to the previous embodiments.

In the embodiments shown in FIGS. 11 and 12, the cable holding device 11 includes only the spring 91. In other examples, the cable holding device 11 based on the spring may include a hub (not shown). The hub may work in a similar fashion to the hub 17 described above.

In all the above embodiments, the cable holding device 11 directly engages the cable 7. There is no intermediate component between the holding device 11 and the cable 7. The seal 13 also engages the cable. The seal 13 engages the cable at a different point along the length of the cable 7 to the cable holding device 11. There is no overlap between the cable holding device 11 and the seal 13.

The cable holding device 11 engages around the circumference of the cable 7 (either through spaced fingers 19, an annular ring 69, or the coils of a spring). In other embodiments, the cable holding device 11 may only engage a portion of the circumference. Similarly, the cable holding device may engage a single point or portion along the length of the cable 7 received within the end cap 5.

In the embodiment shown in FIG. 1, the seal 13 includes a projection 75 extending outside the cap nut 5 to engage the cable surface 35. This is just one example of a seal that may be used, and any suitable shape or arrangement seal 13 may be used. As discussed above, in some examples, the seal may be shaped to provide the urging surface 33 or a ledge for the holding member 11 to rest on. In some examples, the seal 13 may be omitted altogether, or provided in a separate part of the gland assembly 1 (along with additional further seals).

The seals 13 shown above are formed separately from the body 3, cap nut 5 and holding device 11. However, it will be appreciated that the seal may be integral or joined to the body 3, or cap nut 11. Similarly, the seal 13 may be integral to or joined to the hub 17.

The outer surface of the cap nut may also be provided with ridges extending along its length from the first end 27 to the second end 29. The ridges may allow a user to better grip to cap nut 5 to tighten it, or may be mateable with a tightening tool for use on the cap nut 5.

From the above embodiments, it can be seen that the hub 17 may rest against the seal 13, a ledge formed in the cap nut first end 27, a ledge formed in the cap nut second end 29, or the body 3. It will also be appreciated that the hub 17 may rest against a separate element (not shown) threaded over the cable 7, within the cap nut 5.

In all of the above embodiments, the urging surface 33 may be formed in the seal 13, the cap nut first end 27, the cap nut second end 29, or the body 3. It will also be appreciated that urging surface 33 may be formed in a separate element threaded over the cable 7, within the cap nut 5.

In the above description, the gland assembly 1 has been described with reference to a cable gland assembly 1, which includes a cable 7 passing through a through bore 9 formed in the assembly 1. However, it will be appreciated that this is by way of example only, and any suitable elongate member may pass through the through bore 9.

The invention has application including but not limited to
Gland assemblies for armoured electric cable or fibre optic cable or pipes or conduits;
Gland assemblies for non-armoured electric cable or fibre optic cable or pipes or conduits;
Barrier gland assemblies for electric cable or fibre optic cable or pipes or conduits; and
Non-barrier gland assemblies for electric or fibre optic cable or pipes or conduits.

It will also be appreciated that, depending on the application, the gland assembly 1 may include other parts such as an adaptor (or third gland member) connectable to the body 3 for securing the gland assembly 1 to the wall of an enclosure, a second seal within the adaptor, a clamping arrangement within the gland assembly 1 for securing cable armour, a barrier sleeve containing a hardenable filler compound within the gland for providing a flameproof seal. These and other features of gland assemblies will be familiar to those skilled in the art and are not described in detail as they do not form part of the present invention. It will be understood that the invention has application to such gland assemblies and the above description is provided by way of non-limiting example of the application of the invention to the gland assembly depicted in the drawings.

While the invention has been described with reference to exemplary embodiments, it will be understood that we do not intend the invention to be limited thereto and that various modifications and changes may be made without departing from the principles and concepts of the invention.

Other modifications and changes that can be made without departing from the principles and concepts described herein will be apparent to those skilled in the art and are covered herein.

It will also be understood that the invention extends to and includes any novel feature or combination of novel features described herein.

What is claimed is:

1. A cable gland assembly including:
    a body having an inner surface defining a passage, the passage extending in an axial direction;
    a gripping assembly received within the passage, the gripping assembly configured to:
        apply a gripping force to an elongate member extending through the passage in response to a torque applied to the body; and
        increase the gripping force on the elongate member in response to a linear force applied to the elongate member; and
    a seal assembly received within the passage, the seal assembly retained in the axial direction between an end of the gripping assembly and a retaining element on the inner surface of the body, the seal assembly including an annular seal member engaging an outer surface of the elongate member independent of the torque applied to the body,
    wherein the gripping assembly and the seal assembly are non-overlapping along the axial direction.

2. The cable gland assembly of claim 1, wherein the gripping assembly includes a gripping member having:
    an annular hub; and
    one or more fingers extending from the hub.

3. The cable gland assembly of claim 2, wherein the gripping assembly includes:
    an annular support adjacent the hub along the axial direction.

4. The cable gland assembly of claim 3, wherein the gripping member is rotatable relative to the annular support.

5. The cable gland assembly of claim 3, wherein the seal assembly is rotatable relative to the annular support.

6. The cable gland assembly of claim 3, wherein the seal assembly abuts the annular support.

7. The cable gland assembly of claim 2, wherein the inner surface includes a portion defining an urging surface arranged to engage ends of the fingers remote the annular hub, and deflect the ends of fingers inwards in response to a torque applied to the body.

8. The cable gland assembly of claim 7, wherein the urging surface is formed at a first end of the passage, and the retaining element is spaced from both the first end of the passage and a second end of the passage, opposite the first end, in the axial direction.

9. The cable gland assembly of claim 7, wherein the retaining element is formed at a first end of the passage, and the urging surface is spaced from both the first end and a second end of the passage, opposite the first end, in the axial direction.

10. The cable gland assembly of claim 1, wherein the body comprises:
    a first gland member defining a first through bore forming a first portion of the axial length of the passage, the first through bore extending from a first end to a second end; and
    a second gland member defining a second through bore forming a second portion of the axial length of the passage, the second through bore extending from a first end to a second end,
    wherein the first and second gland members are engageable by means of mating screw threads formed at the first end of the first gland member and the second end of the second gland member.

11. The cable gland assembly of claim 10, wherein the second end of the second gland member extends into the first end of the first gland member; and wherein the retaining element is formed by the second end of the second gland member.

12. The cable gland assembly of claim 11, wherein the seal assembly comprises only the annular seal member.

13. The cable gland assembly of claim 1, wherein the retaining element is formed at a first end of the passage.

14. The cable gland assembly of claim 13, wherein the body comprises an annular lip extending partially across the passage at the first end, the annular lip forming the retaining element.

15. The cable gland assembly of claim 14, wherein the body comprises a rib formed on the inner surface, the rib retaining the seal assembly between the first end of the passage and the rib.

16. The cable gland assembly of claim 15, wherein the rib comprises a lead in edge opposite the first end of the passage, to facilitate insertion of the seal assembly past the rib.

17. The cable gland assembly of claim 1, wherein the seal assembly comprises:
   the annular seal member; and
   a retaining ring provided adjacent the seal along the axial direction.

18. The cable gland assembly of claim 17, wherein the retaining ring is provided between the gripping assembly and the annular seal member, and the annular seal member is provided between the retaining ring and the retaining element.

19. The cable gland assembly of claim 17, wherein the annular seal member and retaining ring are engagable by interengaging projections.

* * * * *